Sept. 27, 1938.  J. T. BEECHLYN  2,131,035
MAGNETIC SPEED CHANGER
Filed Dec. 24, 1935  2 Sheets-Sheet 1
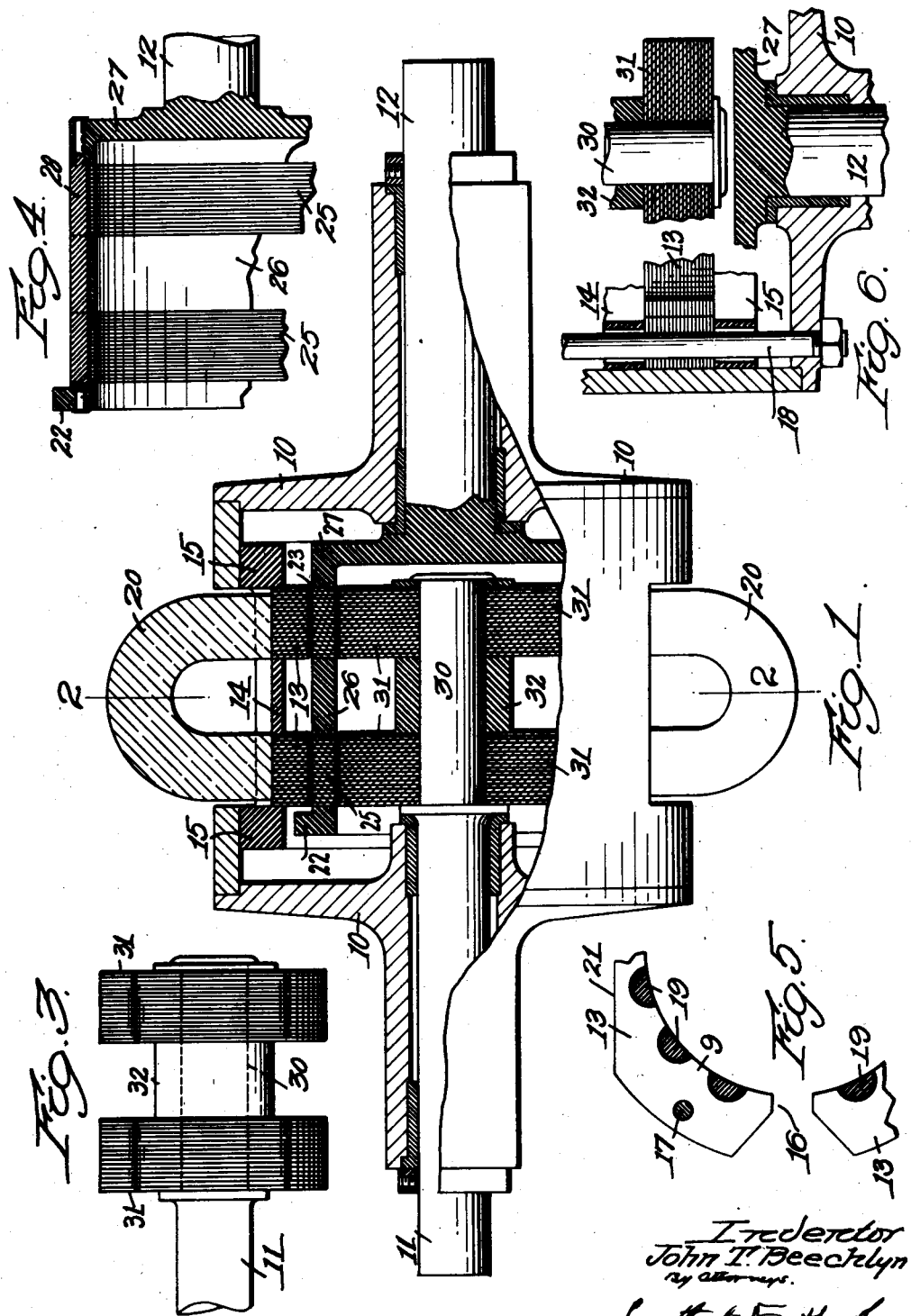

Sept. 27, 1938.        J. T. BEECHLYN         2,131,035
                    MAGNETIC SPEED CHANGER
             Filed Dec. 24, 1935      2 Sheets-Sheet 2
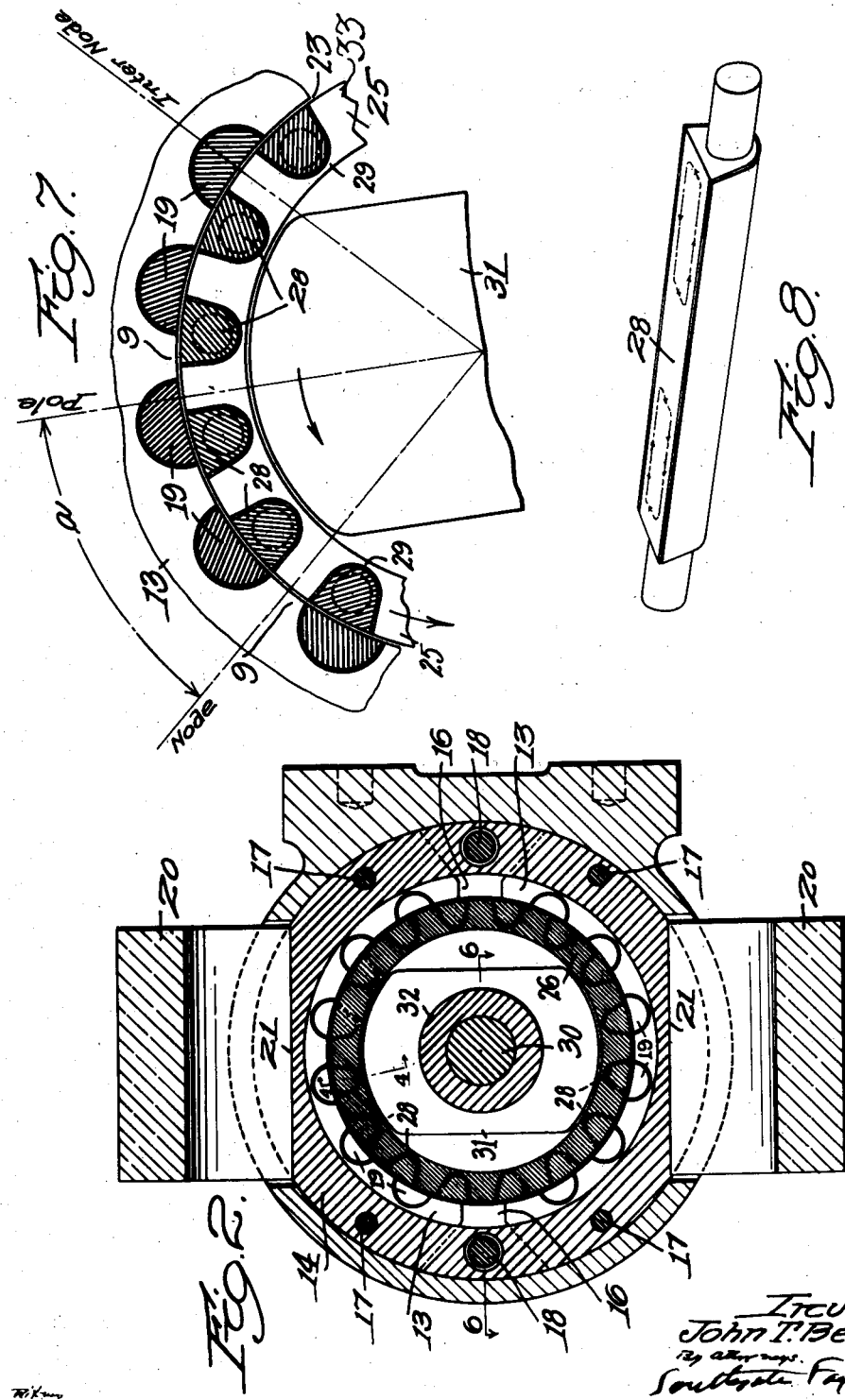

Patented Sept. 27, 1938

2,131,035

UNITED STATES PATENT OFFICE 2,131,035

MAGNETIC SPEED CHANGER

John T. Beechlyn, Worcester, Mass., assignor of one-half to O. S. Walker Co. Inc., Worcester, Mass., a corporation of Massachusetts Application December 24, 1935, Serial No. 56,040

7 Claims. (Cl. 172—284)

This invention relates to a magnetic speed changer of a purely magneto-dynamic character.

The principal objects of the present invention are to decrease the complication and expense and increase the energy per unit of weight as compared with other magnetic speed changers and thus decrease the size and weight for any given capacity; to solve certain structural problems connected with the low speed rotor that heretofore have remained unsolved and thus barred the practical use of magnetic transmission; to provide the laminations of the low speed rotor in the form of a continuous ring; to provide for rigidly and permanently holding the flux conductors of said ring in place; to provide two sets of electric conducting rods which act, by means of induced electric currents therein, so as to increase the rate of separation of the magnetic flux during relative motion or rotation of the stator and said rotor for the purpose of making this construction more compact and increase capacity with a given air gap or a given amount of magnetic material; to provide clamping means for the rotor of non-inductive construction; to form the stator laminations in a pair, or pairs, of sections and employ them in connection with the vernier principle, and to provide a stationary source of magnetic energy in connection with a heteropolar design of speed changer.

Other objects and advantages of the invention will appear hereinafter;

Reference is to be had to the accompanying drawings, in which

Fig. 1 is a side view of a magnetic speed changer of the heteropolar type constructed in accordance with this invention, with parts in diametrical section;

Fig. 2 is a transverse sectional view thereof on the line 2—2 of Fig. 1;

Fig. 3 is an elevation of inner rotor;

Fig. 4 is a radial sectional view on the line 4—4 of Fig. 2;

Fig. 5 is an elevation of one of the laminations of the stator;

Fig. 6 is a section on the line 6—6 of Fig. 2;

Fig. 7 is a fragmentary view showing parts illustrated in Fig. 2, but on enlarged scale, and Fig. 8 is a perspective view of one of the rods of electricity conducting material for the outer rotor.

In the embodiment of the invention shown in the drawings, which show a heteropolar speed changer, a stationary casing 10 of non-magnetic material is provided with bearings for two shafts 11 and 12, either of which may be the driving shaft and the other the driven shaft. The rest of the mechanism may be considered as the means for driving the driven shaft at a definite speed, different from that of the driving shaft. Preferably the shafts 11 and 12 are in axial alignment.

The casing 10 is provided with a stator comprising two sets 13 of laminated magnetic iron rings, an annular non-magnetic spacer 14 between them, and two end rings 15 of non-magnetic material, all stationary. The laminated iron rings 13 are divided, preferably into two segments spaced apart at 16. Bolts 17 clamp the laminations together and hold them on the rings 15. Two bolts 18 pass through the spaces 16 and hold the two end bearing caps of the casing 10 together. The stator is provided at intervals around the inside with a series of projections 9 between which copper inductors 19 without cores are cemented in place. The conductors 19 preferably are cemented to the iron rings with insulating material and spaced apart evenly.

The casing is cut away on opposite sides to provide openings for receiving magnets 20, which are shown as permanent magnets with their poles near, or in contact with, the laminated rings 13. These magnets are seated on two flat surfaces 21 formed by cutting away the material of the laminations. In this form of the machine the two magnets are set oppositely, that is, the north pole of one magnet is opposite the south pole of the other, which is placed opposite the first magnet.

The rotor which is fixed to the shaft 12 comprises a disc-like flange 27 for supporting the shell-like rotor body which comprises non-magnetic clamping flanges 22 and two laminated iron rings 25 aligned with the semi-circular rings 13. These rings 25 are spaced apart by a circular non-magnetic spacer 26. The outer contours of the members 25, 26 and 25, are alike and represent a series of projections 33, the outer tips of which border the outer clearance gap 23, the projections being longitudinally aligned in the three sections, 25, 26 and 25. In the laminated sections 25 these projections 33 serve as flux conductors that during rotation successively form magnetic paths between the inner rotor and the stator. For securing the several members of the rotor body together there extend longitudinally in the spaces between the projections and through perforations in the clamping flanges a series of tie rods 28 constituting inductors. The ends of these rods are secured to the flanges by riveting or welding during which process the intervening sections have been tightly clamped by applied pressure.

These rods have an enlarged section for the main portion of their length for a purpose to be described. The rods 28 are made of an electric conducting material, preferably copper. There is a small gap between these conductors and the laminations and middle spacing ring to avoid electrical contact. This is shown as being provided for by a coating of a thin insulating layer of "Bakelite", or other convenient insulating material.

The similar conductors 19, located in the stator, serve no mechanical purpose. They are simply blocks of copper set individually in an insulating compound between the projections in each of the two spaced sections of laminations 13. During rotation currents are induced in these conductors and in the rotor rods 28.

The inner rotor 30 is, of course, fixed to the shaft 11 and is provided with a dual laminated soft iron non-circular armature 31, the two parts being separated by a ring 32 on the shaft 11. The shape of the rotor 30 shown is circular with two opposite sides cut away.

In accordance with the operating principle of this device, the theoretical requirements demand, in the low speed rotor, a series of laminated radial flux conductors with mutual magnetic separation. Full compliance would involve that, in such design, each of these separated piles of laminations be individually supported laterally by insulated means and the supporting cage itself be non-inductive to prevent the rise of currents similar to those in a squirrel cage rotor of an ordinary induction motor. This can be done only by a costly structure not having the required strength.

Therefore, in the present design, complete magnetic separation of the torque bars or flux conductors 33 has been abandoned. The rotor laminations are made of annular form with a bridge 29 connecting adjoining projections. The cross section of the bridge is small compared with that of the projections. The laminations are held under high compression by means of the rods 28 extending between the projections. In this manner is produced a structure that, within the ultimate limit of static friction, has all the torsional rigidity of a shell of similar form made from solid material. This practical result is obtained however, only through the sacrifice of some effective torque capacity due to the lowering of magnetic potentials by circumferential leakage over the bridge.

The operating principle of this device involves the two cooperating pole series 9 and 33, arranged concentrically, each of which has uniform pole spacing with a moderate difference of spacing in the two series, thus providing an arrangement akin to that of a vernier. This difference will cause the occurrence of nodes, or points where poles of the two series are in substantial alignment, and intervening spaces where a number of poles are not in alignment. Angular motion applied to one series will cause a relatively rapid progressive shift of the nodes. The high speed or third member 31 is magnetically responsive to this progressive transfer of the path of least reluctance.

The relative direction of the transmitted rotation depends on whether the greater pitch of the projections is present in the stator or in the outer rotor. Opposed direction of transmission of motion will be produced if the pitch is greater in the rotor. If it is greater in the stator the drive will be in the same direction as the driver.

When the device is excited, the rotors, if free to turn, will tend to assume a position that provides the highest permeance for the system. The number of poles of the inner rotor and the number of the nodes, being equal, the pole axes and the nodes will be brought into coincidence. The production of torque reactions depends on a displacement from this position of coincidence. This may be attained either by advancing the inner rotor, in which case the device acts as a reduction unit, or by propelling the node axis through an advance of the outer rotor, which gives the function of a step-up device.

A method of raising the elementary torque value is incorporated in the device. In any form of the device all the poles, and practically all of the projections, are subjected to magnetic pulls from various directions. For each pole or projection, these forces may be resolved into two opposing tangential components. The sum of the differentials of these represents the effective torque reaction. The differential cannot be raised by increasing exitation beyond a certain point corresponding to saturation in the projections.

The object of the present method is to increase the effective differential by depressing the opposing component of the torque. This is accomplished by filling the spaces between the projections with material having high electrical conductivity.

Relative rotation of stator and rotor causes the flux to intermittently penetrate these conductors, the greatest penetration at any point in the gap occurring when the projections there are in internodal relation. The flux variations will induce local currents in the conductors and these currents will oppose the flux that creates them, thereby affecting chiefly the component that opposes the useful torque.

In order to promote an understanding of the inductive function it is desirable to first examine the reactions in the elementary form of the device.

Referring to Fig. 7 let it therefore be assumed, for this immediate purpose, that the bars 19 and 28 possess no magnetic or electrical property beyond that of ordinary air. Let it also be assumed that the outer rotor is driven by a directly applied external force in an anti-clockwise direction and that sufficient load is applied to the inner rotor to produce the leading angle $a$. The extent of the angle $a$ that has been chosen for the illustration is one that corresponds to maximum torque transmission and represents a condition where a further increase of load would cause the inner rotor to fall out of step (in the manner of a synchronous motor).

Since the inner rotor pole turns at a higher speed than the driving outer rotor and, in this instance, in the same direction, the leading edge of the pole will progressively overtake and pass successive teeth in the outer rotor, and for each tooth the approach of the pole edge will coincide with the moment when that particular tooth is undergoing alignment with a tooth in the stator and thereby momentarily represents the node. For a limited interval thereafter the tooth in question will be opposite the pole face of the inner rotor until it is passed by the trailing edge of this member and during this interval it is progressively withdrawn from alignment with the cooperating stator tooth.

Obviously, the energy required for this separation is derived from the applied power input, but it will be noted that, during this transition, the rotor tooth has not caused any torque reaction on the inner pole since the flux transmitted through the pole face does not contain any tangential component.

It is evident, therefore, that the absorbed energy is progressively stored in the form of built up reluctance which first becomes dynamically available immediately after the passing of the receding pole edge at which moment the developed reluctance in the outer gap is added to that of the path in the fringing field of the receding pole edge.

It may, therefore, be said that the power input is expended in the work of continuously depriving the receding pole edge of a flux density sufficient to balance the two tangential fluxes acting on the pole, whereas the direct pull in the fringing field at the leading edge is supplied by the magnetizing source without expenditure of energy.

The net torque that may be obtained from a given gap area in the elementary form of the device has a distinct practical limit. The pull at the leading pole edge cannot be raised by increased magnetization, after full saturation of the teeth in the nodal region has been reached, without at the same time increasing the opposing pull in a like degree. Likewise, the reluctance at the internode cannot be raised except by increasing the spaces between the teeth and, since this necessarily involves a reduction of tooth section, the pull at the node will be adversely affected.

The inductor bars provide a means for increasing the effective reluctance delivered at the internode, without affecting the dimensions of the teeth, and also permit the advantageous use of a higher magnetizing force.

By their shape and location these inductors are adapted to intercept and be traversed by the fringing fluxes developed during separation or approach of the teeth. They differ from the conventional form of inductor in that they do not provide an inductive path linking with the normal flux path of the core (tooth) with which they are associated. By virtue of these facts the apparent effects of inductance are, in general, the reverse of those experienced with a core-linked type of inductor.

Thus, with a core-linked inductor, the diminution of flux attending the separation of two core parts will induce currents in a direction tending to sustain the transmitted flux. Under the same conditions the present (extraneous) type of inductor is responsive to the flux rise in the fringing field that occurs simultaneously with an actual decline of the transmitted flux. The direction of the induced currents is therefore the reverse of those in the former instance and their tendency is to hasten the decline of the flux.

Obviously, with the same rate of physical separation the instantaneous values of effective reluctance and mechanical reaction will be quite different in the two cases, representing opposite effects with respect to a median condition represented by a similar system devoid of inductors.

Referring again to Fig. 7, it will be seen that the flux fringing which induces the opposed polarization in the inductors starts simultaneously with the separation of the teeth and continues to develop until the entire flux remnant is transmitted through the inductors. Under these conditions the total flux transmitted over the pole-face will be considerably less than with the elementary type already described. The added reluctance which has been developed represents an increased power input which may be ascribed to the mutual repulsion between the tooth and the cooperating polarized inductor as these elements are progressively pulled into opposed relation.

As the internodal relation is approached the induced E. M. F. will be diminished but, since the flux path between the outer rotor and stator is by now definitely and highly inductive, there can be no instantaneous collapse of the developed energy through this channel. On the other hand, there is no inductance between the rotor tooth and the pole and since, at this moment, the pole enters a receding stage with respect to the tooth, the energy will be absorbed in the lengthening path of the fringing pole field during a brief interval. Since the energy thus transmitted really represents a flux deficiency, the flux density at the trailing pole edge will be less than with the elementary type and the net torque will be correspondingly higher.

It will be seen that the inductor bars, through induced polarization, serve as a shield against magnetic penetration, a property that rests on their electrical conductivity.

Since in practice conductivity is limited to that of copper at ordinary temperatures, the effectiveness of the shield will increase with the speed of rotation and the use of the inductors is therefore particularly advantageous in high speed power transmission.

Having thus described my invention and the advantages thereof, I do not wish to be limited to the details herein disclosed, otherwise than as set forth in the claims, but what I do claim is:—

1. In a magnetic hetropolar speed changing device, the combination of a stator body divided magnetically into two sectors, having inwardly extending projections disposed circumferentially over the two sectors and matching a uniform angular division of the entire circumference, a rotatable member having an annular series of uniformly spaced flux conductors adapted to cooperate with the stator projections, the space between each two adjacent flux conductors differing from that of the stator projections, a second rotatable member having salient poles adapted to cooperate with the magnetic nodes produced by interaction of the stator projections and the flux conductors, and means for causing an activating flux to traverse the three members with the two stator sectors at opposite polarity.

2. In a magnetic speed changing device of the class described, a rotor having a body composed of annular laminations divided into two sections and having a series of spaced projections, means for causing magnetic fields of opposite signs in the two sections, an annular non-magnetic spacing member between the sections, a non-magnetic clamping flange at the outer end of each section, and non-magnetic tie rods under tension secured at their ends to said clamping flanges, the tie rods being situated in the spaces between the projections without contacting the projections or the spacing member, whereby the clamping structure is non-inductive with respect to the magnetic flux traversing, in equal volume and under opposite sign, the two body sections in any given sector.

3. In a magneto-dynamic device, the combination of two magnetic parts having a clearance gap separating them, relatively movable in a direction parallel to said gap, each of said parts having an edge receding abruptly from the gap, said edges facing in opposite directions along the line of motion, means for setting up a magnetic flux through said parts and gap, means for relatively displacing said parts to alter the flux transmitted by them, and a mass of metal having high electrical conductivity attached to each of said parts closely adjacent to the gap and closely adjacent to the edge on each respective part, said masses being inductively extraneous to the magnetic circuit when the parts are in magnetic alignment and adapted to be inductively traversed by the flux during the relative displacement of said parts, whereby the normal rate of flux change during the displacement is usefully altered.

4. A synchronous magnetic speed changer comprising three members arranged successively within each other and separated by annular clearance gaps, two of the members being rotatable, a series of copper inductors on each of two successive members, said inductors being uniformly spaced circumferentially on each of the two members, but with different spacing in the two series, each of said inductors providing an inductive circuitous path lying in a surface bordering the clearance gap between the said two members, the circumferential span of each inductor circuit equal to or greater than the space separating it from a neighboring inductor in the same series, means for causing a magnetic flux to traverse the two inductor carrying members, and means on the third member for causing a circumferential inequality of the flux.

5. In a magneto-dynamic device, the combination of two magnetic parts having a clearance gap separating them, relatively movable in a direction parallel to said gap, a pole face bordering the gap on each of said parts, a flanking surface on each of said parts, each of said flanking surfaces receding abruptly from the gap and the pole face on the respective parts, the two surfaces facing in opposite directions along the line of motion, means for setting up a magnetic flux through said parts and gap, means for relatively displacing said parts to alter the flux transmitted by them, and a copper inductor affixed to the flanking surface on each part closely adjacent to the gap, each of said inductors being inductively extraneous to flux transmitted over the pole face of the affixed part, but inductive with respect to flux transmission between the affixed flanking surface and the pole face of the opposing part, occurring during relative displacement of the parts, by which inductance the normal rate of flux change during the displacement is usefully altered.

6. A magnetic power transmission device comprising three magnetic members arranged successively within each other and separated by two annular clearance gaps, two of the members being rotatable, means for causing a magnetic flux to traverse the three members, a circumferential series of uniformly spaced and inwardly extending magnetic projections on the outer member, an annular series of uniformly spaced magnetic elements in the intermediate member adapted to cooperate with the projections in the outer member, the spacing of said elements differing from that of the projections, whereby are produced circumferentially disposed magnetic nodes of low reluctance through the varying degree of alignment between said projections and said magnetic elements, magnetic poles on the innermost member, said poles being adapted to move in unison with the magnetic nodes during relative rotation of the three members, and a narrow bridge in the intermediate member, said bridge connecting adjacent magnetic elements and integral with them, the radial depth of said bridge being less than one fourth of the height or width of said magnetic elements.

7. A magnetic power transmission device comprising three magnetic members arranged successively within each other and separated by two annular clearance gaps, two of the members being rotatable, means for causing a magnetic flux to traverse the three members, a circumferential series of uniformly spaced and inwardly extending magnetic projections on the outer member, an annular series of uniformly spaced magnetic elements in the intermediate member adapted to cooperate with the projections in the outer member, the spacing of said elements differing from that of the projections, whereby are produced circumferentially disposed magnetic nodes of low reluctance through the varying degree of alignment between said projections and said magnetic elements, magnetic poles on the innermost member, said poles being adapted to move in unison with the magnetic nodes during relative rotation of the three members, annular laminations in the intermediate member embodying the magnetic elements in said member, non-magnetic spaces between the magnetic elements, said spaces extending radially from one of said clearance gaps to within a relative short distance of the other clearance gap, non-magnetic clamping flanges at the ends of the laminations, non-magnetic tie rods secured at their ends to said clamping flanges, the tie rods extending axially in said non-magnetic spaces and holding the laminations under high compression.

JOHN T. BEECHLYN.